United States Patent [19]

Peschel et al.

[11] 4,043,221
[45] Aug. 23, 1977

[54] MASS-IMBALANCE OSCILLATION GENERATOR

[75] Inventors: Dieter Peschel, Schwalbach; Dieter Funke, Bad Soden, both of Germany

[73] Assignee: Metallgesellschaft Aktiengesellschaft, Frankfurt am Main, Germany

[21] Appl. No.: 568,734

[22] Filed: Apr. 16, 1975

[30] Foreign Application Priority Data

Apr. 18, 1974 Germany .................... 2418641

[51] Int. Cl.² ........................................ F16F 15/22
[52] U.S. Cl. .................................... 74/573 R
[58] Field of Search ............................... 74/573

[56] References Cited

U.S. PATENT DOCUMENTS

| | | | |
|---|---|---|---|
| 2,341,695 | 2/1944 | Critchfield | 74/573 |
| 2,771,240 | 11/1956 | Gurin | 74/573 |
| 3,410,154 | 11/1968 | Deakin | 74/573 |
| 3,463,551 | 8/1969 | Clay | 74/573 |

Primary Examiner—Samuel Scott
Assistant Examiner—Wesley S. Ratliff, Jr.
Attorney, Agent, or Firm—Karl F. Ross; Herbert Dubno

[57] ABSTRACT

A mass-imbalance oscillation generator comprises a trough in which a rolling element, such as a cylindrical roller or ball, is permitted to move between one side and another between two stable positions in response to centrifugal force generated by rotation of the shaft carrying the trough. The rolling mass can assume either of two stable positions depending upon the speed of the shaft, one of the positions corresponding to a higher potential energy of the mass than the other position to enable shifting movement of the mass.

10 Claims, 18 Drawing Figures

MASS-IMBALANCE OSCILLATION GENERATOR

FIELD OF THE INVENTION

The invention relates to an apparatus for generating oscillations by mass imbalance in a rotary system and, more particularly, to an arrangement in which two different imbalanced conditions can be created.

BACKGROUND OF THE INVENTION

Rotary mass-imbalance systems can be defined as systems in which a shaft or other member is rotatable about an axis by a motor or the like and is constructed with, or carries a mass whose center of gravity is offset from the axis of rotation. Since the unbalanced mass acts at its center of gravity or center of mass and the latter does not coincide with the axis of rotation of the shaft or body the combined center of gravity of shaft and the mass is eccentric and an oscillation is imparted to the structure in which the shaft is journaled.

Such mass-imbalance rotary system serve as oscillatory drives for feed machines (bulk-solid metering devices), transport apparatus and material-working machines, such as deburrers, polishers, grinders and the like.

Generally speaking one attempts with rotary systems to eliminate all imbalance or to minimize imbalance so as to insure uniform rotation, minimum vibration and minimum wear of the apparatus, in oscillatory drives of the type described above, (eccentricity) such imbalance is purposely created. Depending upon the throw of the umbalanced mass, the magnitude of the unbalanced mass and the speed of rotation, practically any desired oscillatory system can be created with rotary unbalanced masses.

The apparatus can include containers, troughs, tools or the like which are set in motion by the oscillatory drive for various purposes.

For example, devices have been proposed for the surface treatment of workpieces by particles of solid abrasive material, liquid suspension medium, chemically active liquids and polishing or grinding agents of various types, in which the articles to be treated and the treating agent or agents are introduced into a container which is subjected to an oscillatory movement. As a result of the relative movement between the components of the mixture it is possible to obtain polishing, grinding, smoothing and abrading or deburring of the workpiece.

For the most part, an apparatus of this type can comprise a frame, foundation or base upon which the container is mounted for oscillatory movement. An oscillatory drive of the character described is used to displace the container and auxiliary devices can be provided for delivering the components of the mixture to the receptacle and emptying the latter.

In most surface treatment systems, the oscillatory drive comprises an electric motor carrying a shaft which is journaled with minimum play relative to the motor and upon which an unbalanced mass is mounted. The shaft is journaled in bearings fixed to the container so that the oscillations of the shaft are transmitted by these bearings to the container and the latter undergoes an oscillatory movement. When the container is formed as an annular trough, the oscillatory drive has a vertical shaft disposed centrally of the trough.

For various reasons it has been desirable to establish different oscillatory-movement status, e.g. to alter the type, degree or rate of surface treatment, to accommodate articles of different sizes, to permit optimum results with different fluids etc. Frequently it is desirable to treat the articles successively or selectively at a low rate and at a high rate (corresponding to one and another oscillation condition respectively) or to vary the circulation or feed action in the container.

These requirements have been fulfilled heretofore in a system in which replaceable unbalanced weights of different dimensions were releasably mounted upon the rotaton system. Furthermore the removal and attachment of weights permits them to be mounted in different angular relationships to one another for various purposes.

Because the entire rotation system, in use, constantly is being vibrated, all of the parts thereof are subject to relatively large wear and must be of simple and strong construction to allow economical replacement or to enable them to withstand the stresses. This of course applies especially to those structural elements which have been removable and replaceable. Hence, when removable weights are used, the entire structure must be made stronger and more massive than would otherwise be required. Another disadvantage of the prior art system is that the adjustment of the degrees of imbalance, replacement of the weights and positioning thereof is a complicated manipulative proceeding and increases the difficulties of operating the apparatus. Not only does the adjustment require considerable time and skill, but, for safety reasons, the adjustment portions must be shielded or enclosed to prevent the operator from coming into contact with the moving parts. In practice, the apparatus must be equipped with lockout controls or the like to prevent the system from being set into motion by an operator while adjustment is in progress.

It has been proposed, in an effort to eliminate the last-mentioned difficulties, to provide an oscillatory drive with pneumatic, hydraulic or other auxiliary means for selectively positioning a weight between two different orientations or locations. However, even this arrangement has significant disadvantages. For one thing, the energy necessary to operate the auxiliary mechanism must be fed to an oscillating system, thereby raising the possibility of damage and interruption of the system or damage to the auxiliary devices. Apart from the significantly increased cost of such devices, there is the disadvantage that devices which rotate with the system and are supplied by an external source create technical difficulties with respect to design and construction.

To position an imbalance weight between two alternate locations in a rotation system for the purpose described, it has also been proposed to utilize the reversing effect of the drive electric motor so that the weight assumes one position when the motor is rotating in one sense and the alternative position when the motor is rotated in the opposite sense. This arrangement has the disadvantage that the bearings are stressed and subjected to more wear with motor reversal than with a system in which the motor operates only in a single sense.

OBJECTS OF THE INVENTION

It is the principal object of the present invention to provide an oscillatory drive arrangement, in a rotary system, enabling two distinct mass-imbalance states to be established, at minimum cost, with ease in switching between the two states and with freedom from the difficulties encountered heretofore.

SUMMARY OF THE INVENTION

This object and others which will become apparent hereinafter are attained, in accordance with the present invention, in a rotation system capable of developing two different angularly offset mass-imbalance states and in which a movable imbalance mass is guided between the two positions. According to the invention, at least immediately after the system has been brought to standstill, the weight assumes one eccentric rest position A (or B) under the effect of a restoring force against which the centrifugal force on the body is effective.

Upon rotation of the system at a predetermined speed sufficient to overcome the restoring force, the mass or body assumes an end position A' (or B') which corresponds to its imbalance state, i.e. position of the center of mass, but at a higher potential energy at the same side. Upon termination of rotation and, as a result of the restoring force of the higher potential energy, the body returns to an opposite rest position or imbalance state B (or A). The device thus has two stable conditions into which it alternately reverts by the use of the potential energy of the mass gained when the system is driven at a speed at least sufficient to overcome the restoring force. The stable positions A, B and metastable positions A' B' being located at opposite sides of the device.

According to an important feature of the invention, the metastable end positions A' or B' correspond to a higher potential energy of the displaceable mass or body by comparison to the potential energy in the stable rest positions A or B. Preferably the rotation system has a vertical axis, and the restoring force is at least in part generated by gravitational forces.

In another embodiment of the invention, the restoring forces use elastic stress of a deformable structural element.

The movable mass can, according to the invention, include at least one ball or roller although it is possible to use a liquid as the imbalance mass.

According to a further feature of the invention, the device comprises an outer housing within which a movable inner housing is displaceable, the latter forming a ramp, track or guide for the imbalance mass or body which is shiftable therealong. Between the inner and outer housing there is provided means for stabilizing the inner housing relative to the outer housing in the end position A' or B' from which the inner housing and the weight can return, upon removal of the centrifugal force and the result of gravitational force, to their opposite stable or rest positions B and A. The stabilizing means, preferably levers or a viscous medium contained in a filled elastic bladder, can be interposed between opposite ends of the ramp of the inner housing and adjoining walls of the outer housing. The bladder can have a substantial horizontally effective part and a horizontally effective part connected through a throttle region which introduces a time factor into the transition between states. As the viscosity of the medium is increased however, it is possible to dispense with the throttle. In other words for a low-viscosity liquid a throttle may be omitted. The medium may be a thixotropic substance serving as a viscous medium or a compressible gas serving as a more flowable medium.

The advantages of the system of the present invention will be immediately apparent since there are no mounting difficulties involved in manual replacement or adjustment of the weight, external energy supplies for the adjustment means are eliminated and it is not necessary to reverse the motor. It is possible to establish the restoring force and the centrifugal force so that the switching over between one stable state of the weight and the other can take place at any rotation speed and it has been found particularly advantageous to design a stabilizing means so that the weight is shifted by a 10% reduction of the speed from one position to the other.

BRIEF DESCRIPTION OF THE DRAWING

In the drawing:

FIG. 1c is a section taken along the line Ic—Ic of FIG. 1a;

FIG. 2b is a force diagram of the forces acting upon the weight in the position shown by FIG. 2a;

FIG. 3b is a force diagram of the forces acting upon the weight in the position shown by FIG. 3a;

FIG. 7b is a force diagram associated with FIG 7a;

SPECIFIC DESCRIPTION

Figure 1A:
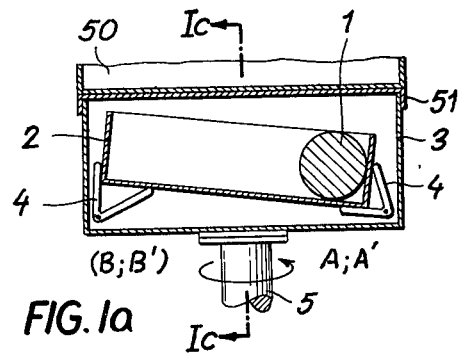
FIG. 1a is a vertical section through an oscillatory drive according to the invention, some parts being shown diagrammatically.
Figure 1C:
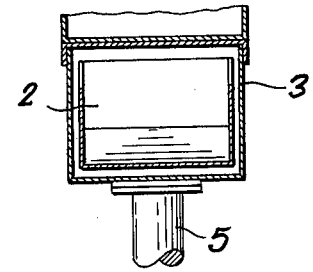
Figure 1B:
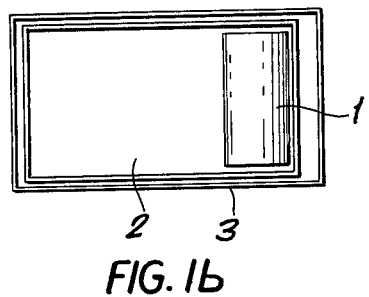
FIG. 1b is a plan view of the device with the container for the treating system removed.

In FIG. 1 we have shown an oscillatory drive for a container 50 which may receive metal articles to be deburred together with abrasive powder and a liquid vehicle in accordance with conventional practice.

Figure 5A:
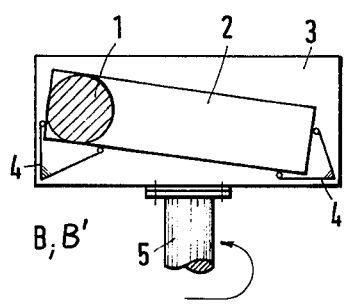
FIG. 5a is a diagram of another phase of operation.
Figure 5B:
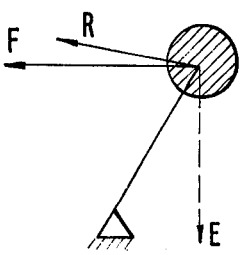
FIG. 5b is the force diagram associated therewith.

The container 50 is mounted upon a cover 51 for an outer housing 3 of upwardly open rectangular cross-section and in which is mounted a trough 2, also of rectangular cross-section, and containing a cylindrical weight 1 which is capable of rolling along the floor of the trough 2, the latter forming a ramp. The trough 2 can assume either of two stable position (compare FIG. 2a with FIG. 5a) by the joint operation of a pair of levers 4 which are fulcrumed in the housing 3 and lift the respective ends of the trough 2 when the radially outward force on the lever is increased by centrifugal forces resulting from rotation of the system at high speed. The housing 3 is carried upon a shaft 5 which may be rotated in the sense represented by the arrow.

Figure 2A:
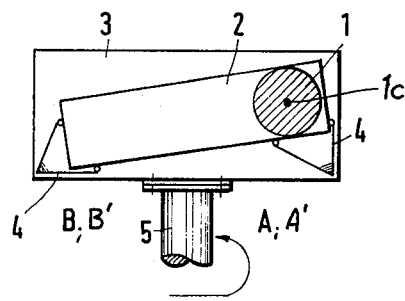
FIG. 2a shows the device of FIG. 1a in its other limiting position.
Figure 2B:
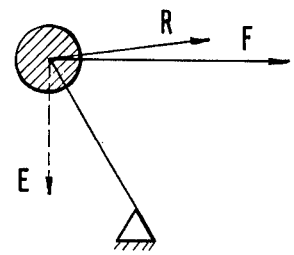

When the system of FIG. 1a is rotated about a vertical axis, centrifugal forces acts upon the imbalance mass 1 to urge the latter outwardly. This force tends to swing the right-hand lever 4 in a clockwise sense (FIG. 1a)

and hence raise the right-hand corner of the trough 2 (FIG. 2a). As a result, the center 1c of the mass 1 is shifted from a distance D from the axis X of rotation of the system to a distance D' therefrom, this corresponding to a change in location of the center of mass between two stable states. As seen from the force diagram of FIG. 2b, for example, the centrifugal force F can be resolved into two components, namely, one causing the weight to ride upwardly and the other corresponding to displacement parallel to the ramp as represented by the resultant force R. The weight is thus lifted against gravitational force E to a higher level (FIG. 2a).

Figure 3A:
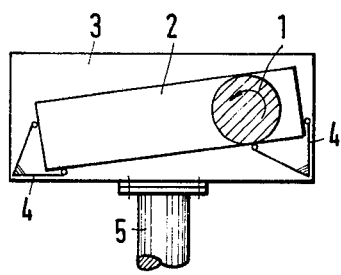
FIG. 3a shows the condition of the device of FIG. 2a when the gravitational forces are dominant.
Figure 3B:
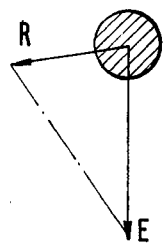
Figure 4:
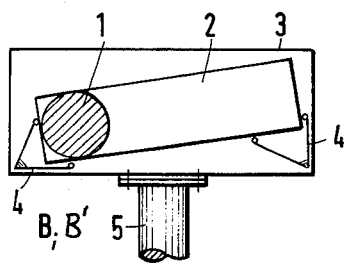
FIG. 4 shows the position of the device in another extreme position.

The weight retains its higher level A as long as the centrifugal force is maintained and, when the centrifugal force is removed (FIG. 3b) experiences a resultant (gravitationally induced force R to the left. The weight 1 thus rolls down the ramp (FIG. 3a) to assume the position B shown in FIG. 4. At low speeds, the weight will remain in the lower position and, upon the development of the centrifugal force F will press the left-hand lever 4 in the counterclockwise sense tending to elevate this end of the trough to the position b represented in FIG. 5a. In the upper position the weight has a center of mass spaced at a different distance from the axis than the distance of position B.

When the speed again diminishes, so that the centrifugal force is no longer sufficient to counter the gravitational force, the weight 1 rolls back into the position shown in FIG. 1a.

The apparatus thus comprises a rocking member which has one end raised upon the development of sufficient centrifugal force by the outward pressure of the weight thereon and its opposite end lowered while the stabilizing means (i.e. the levers) consists of means for translating lateral force on the rocking through into lifting forces.

If it is desirable to shift the angle of effect of the weight, the distances D and D' may be made identical since the device will switch the angular position of the weight with each standstill of the apparatus through 180° about the axis A relative to the shaft.

Figure 6A:
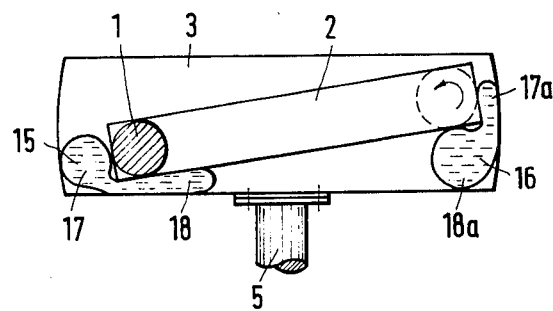
FIG. 6a is a diagrammatic section of another embodiment of the invention.
Figure 6B:
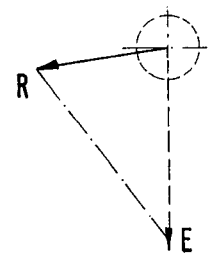
FIG. 6b is the force diagram associated therewith.
Figure 7A:
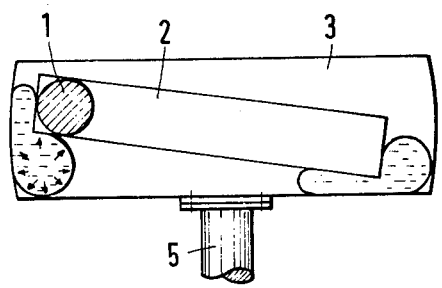
FIG. 7a is a diagram similar to FIG. 6a showing another position of the device.
Figure 7B:
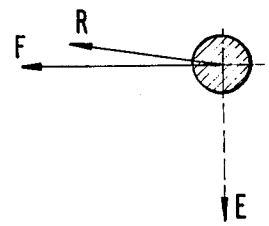

A similar result may be obtained with the system in FIG. 6a in which a viscous medium is received in a resilient bladder 16a having a horizontally effective portion 18 or 18a and a vertically effective portion 17 or 17a. In the position shown in FIG. 6a, application of substantial centrifugal force to the weight 1 will drive the viscous fluid out of the vertical portion 17 of the bladder 15 and displace it into the horizontal portion 18 to lift the trough 2 (see FIG. 7a). When the speed of the device is cut down or terminated, gravitational force E suffices to permit the weight 1 to roll along the ramp to the right-hand side of the trough whereupon the result described above is repeated.

Figure 11:
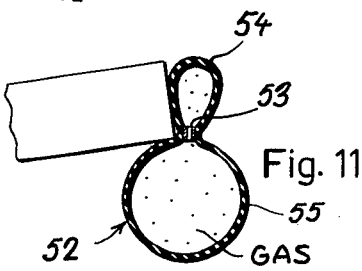
FIG. 11 is a section through another stabilizing means according to the invention.

In FIG. 11 we show an arrangement in which, instead of a viscous medium, the bladder 52 is filled with a compressible gas (low-viscosity medium) and a throttle 53 providing a time lag is provided between the vertical section 54 and the horizontal section 55.

Figure 9:
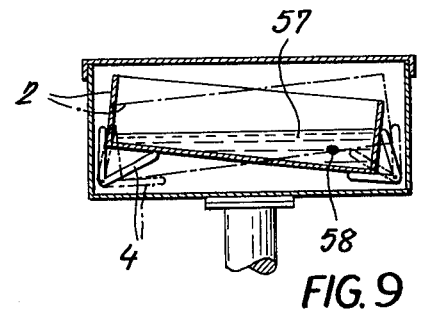
FIG. 9 is a vertical section showing another embodiment.
Figure 8:
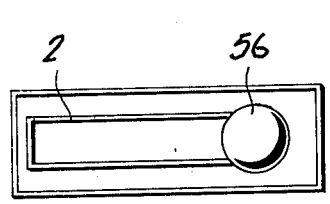
FIG. 8 is a plan view of another embodiment.
Figure 10:
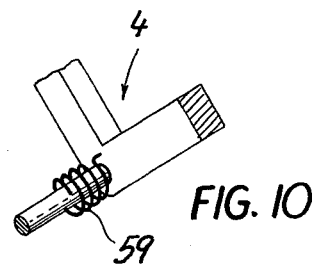
FIG. 10 is a diagram showing another restoring force applying means.

FIG. 8 shows how, instead of a cylindrical weight 1, a ball 56 can be received in the trough 2 while FIG. 9 shows the arrangement when the trough 2 contains a liquid 57 such as mercury as the imbalanced weight. In each position the center of gravity 58 of the liquid shifts as described in connection with FIGS. 1a through 5a. From FIG. 10 it will be apparent that the bell-crank levers 4 may be biased by a torsion spring 59 in the event gravitational forces alone is not to constitute the restoring force.

We claim:

1. An oscillatory drive comprising a rotatable shaft, an imbalance mass entrained by said shaft and shiftable transversely to the axis of rotation thereof, and guide means for controlling the position of said mass to enable said mass to assume an eccentric rest position upon cessation of rotation of said shaft and against a restoring force to enable said mass to assume an end position different from said rest positions under the action of centrifugal force upon rotation of the shaft, said positions having substantially the same angular orientation with respect to said shaft, said guide means further defining an opposite rest position for said mass into which said mass is displaced by said restoring force upon a successive cessation of rotation of said shaft and another end position on the same side as said other rest position and into which said mass is displaced by the reapplication of centrifugal force thereto, said mass and said shaft having a combined center of gravity offset from the axis of said shaft in both of said end positions of said mass, the mass in each end position having a greater potential energy than the mass in the corresponding rest position, said guide means including an inner housing adapted to rock about an axis transverse to the axis of said shaft, an outer housing rotatable by said shaft and receiving said inner housing, and stabilizing levers at opposite sides of said inner housing for transforming lateral centrifugal force thereon to an elevation of the corresponding side of said inner housing.

2. The drive defined in claim 1 wherein said shaft has a vertical axis and the restoring force is centrifugal force.

3. The drive defined in claim 1 wherein said restoring force is an elastic force.

4. The drive defined in claim 1 wherein said mass is a ball.

5. The drive defined in claim 1 wherein said mass is a roller.

6. The drive defined in claim 1 wherein said mass is a liquid.

7. An oscillatory drive comprising a vertical shaft; an outer housing mounted on said shaft end carrying a load to be oscillated; an inner guide member received in said housing and adapted to rock therein about an axis transverse to the axis of rotation of said shaft; a rolling weight displaceable along said guide, said guide being elongated; and respective stabilizers being interposed between each end of said guide and said housing for transforming centrifugal force of said weight into an upward force on said guide, said weight and said shaft having a combined center of gravity offset from the axis of said shaft when said weight is at either end of said guide and said guide is subjected to said upward force, said stabilizers each including a low viscosity fluid enclosed in an elastic flexible bladder having a substantially vertically effective portion and a substantially horizontally effective portion, said bladder being interposed between said housings and each being formed with a time-lag producing throttle between the respective vertically and horizontally effective portions.

8. An oscillatory drive comprising a vertical shaft; an outer housing mounted on said shaft and carrying a load to be oscillated; an inner guide member received in said housing and adapted to rock therein about an axis transverse to the axis of rotation of said shaft; a rolling weight displaceable along said guide, said guide being elongated; and respective stabilizers being interposed between each end of said guide and said housing for transforming centrifugal force of said weight into an upward force on said guide, said weight and said shaft having a combined center of gravity offset from the axis of said shaft when said weight is at either end of said guide and said guide is subjected to said upward force, each of said stabilizers including a fluid-filled bladder interposed between said housing portions.

9. The drive defined in claim 8 wherein the fluid filling said bladder is a compressible medium.

10. The drive defined in claim 8 wherein the fluid filling said bladder is an incompressible medium.

* * * * *